(12) United States Patent
Barrientos et al.

(10) Patent No.: US 10,769,371 B1
(45) Date of Patent: Sep. 8, 2020

(54) AUTOMATIC EXECUTION OF ACTIONS RESPONSIVE TO SEARCH QUERIES

(71) Applicant: Amazon Technologies, Inc., Seattle, WA (US)

(72) Inventors: Ivan Barrientos, Seattle, WA (US); Prakash Bulusu, Bangalore (IN); Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 301 days.

(21) Appl. No.: 15/824,477

(22) Filed: Nov. 28, 2017

(51) Int. Cl.
| | |
|---|---|
| *G06F 40/247* | (2020.01) |
| *G06F 16/9535* | (2019.01) |
| *G06F 40/49* | (2020.01) |
| *G06F 40/274* | (2020.01) |
| *G06F 3/0482* | (2013.01) |

(52) U.S. Cl.
CPC ........ *G06F 40/247* (2020.01); *G06F 16/9535* (2019.01); *G06F 40/274* (2020.01); *G06F 40/49* (2020.01); *G06F 3/0482* (2013.01)

(58) Field of Classification Search
None
See application file for complete search history.

(56) References Cited

U.S. PATENT DOCUMENTS

| 8,670,979 | B2 * | 3/2014 | Gruber | G10L 13/02 |
| | | | | 704/9 |
| 9,189,552 | B2 * | 11/2015 | Riley | G06F 16/9535 |
| 9,881,236 | B2 * | 1/2018 | Dua | G06K 9/52 |
| 9,990,428 | B2 * | 6/2018 | Anand | G06F 16/951 |
| 10,268,778 | B2 * | 4/2019 | Mishra | G06F 16/9535 |
| 10,296,545 | B2 * | 5/2019 | Wendker | G06F 16/9535 |
| 10,296,659 | B2 * | 5/2019 | DeLuca | G06F 40/274 |

* cited by examiner

*Primary Examiner* — Kim T Nguyen
(74) *Attorney, Agent, or Firm* — Eversheds Sutherland (US) LLP

(57) ABSTRACT

Systems, methods, and computer-readable media are disclosed for systems and methods for automatic execution of actions responsive to queries. Example methods include determining a set of seed words for input at a first search engine, determining a first autocomplete result associated with a first word at the first search engine, and determining a second autocomplete result associated with the first autocomplete result at the first search engine. Example methods include determining a set of user interaction histories that comprises queries input at a second search engine, and determining that a first user interaction history includes a query with a portion of the second autocomplete result. Example methods include determining a user action performed after the query, and associating the user action with the query in a database, such that subsequent inputs of the query cause the first user action to automatically occur.

19 Claims, 7 Drawing Sheets

AUTOMATIC EXECUTION OF ACTIONS RESPONSIVE TO SEARCH QUERIES

BACKGROUND

Users may desire to find information, products, instructions, and other types of information online using a search engine. For example, a user may search for operating instructions for an electronic device using an online search engine. In another example, users may search for products to purchase or for product reviews using search engines. Such search engines may return search results that may or may not be relevant to the user's search request. The user may peruse the search results to find information that is desired or relevant to the user. For example, if a user is searching for information on how to adjust a brightness setting for a display device, the user may find an operating manual and then implement the operations needed to adjust the brightness on the display device. Users may perform searches and then separately implement actions. Accordingly, automatic execution of actions responsive to search queries may be desired.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
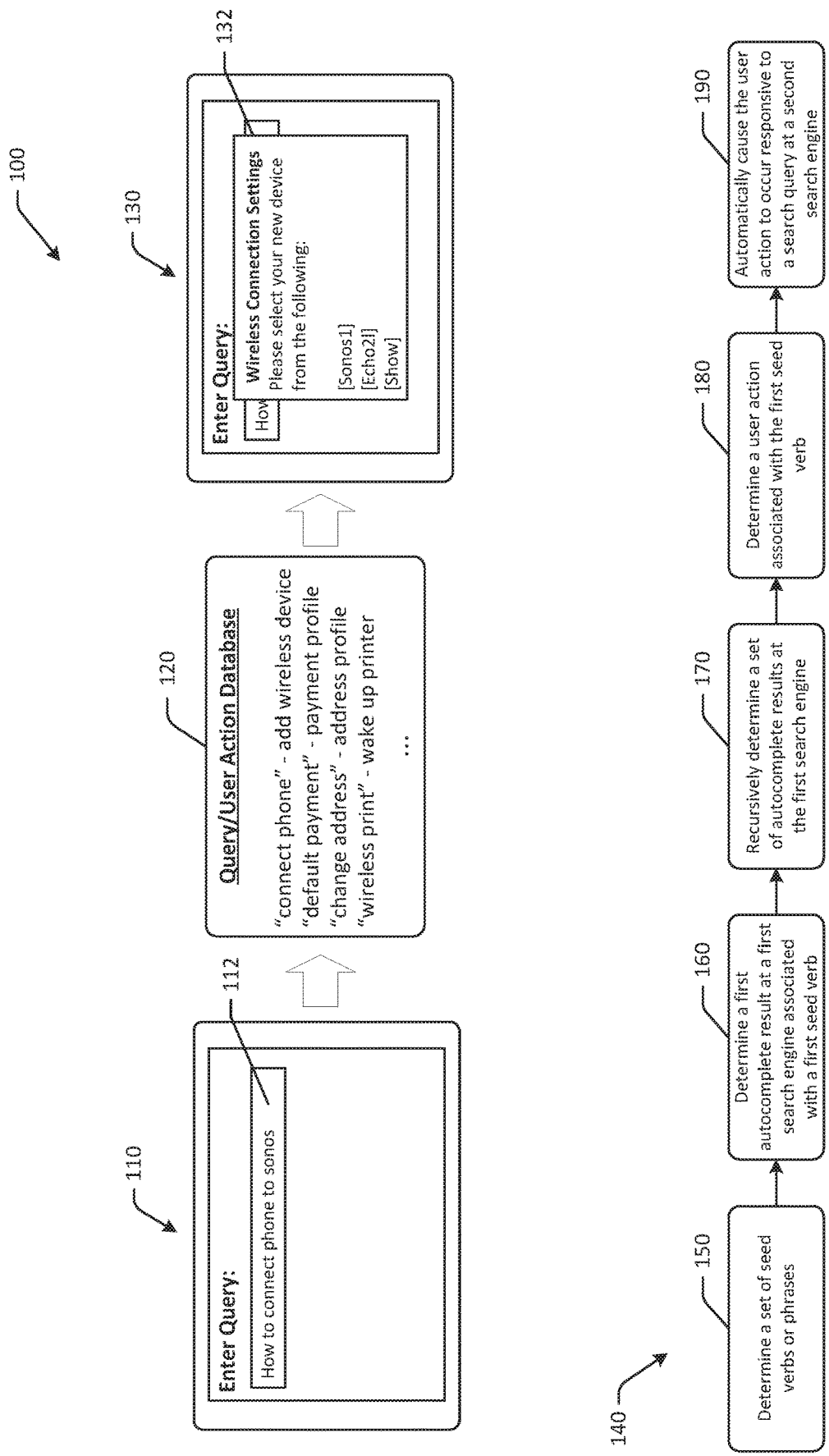
FIG. 1 is a schematic illustration of an example use case for automatic execution of actions responsive to search queries in accordance with one or more example embodiments of the disclosure.

In order to find information, such as information regarding products, digital content, consumer reviews, operating instructions, or other information, users may input one or more search queries at a search engine. The search engine may parse the search query and return a number of potentially relevant links or information that may be relevant to the search query. For example, a search query of "Game of Thrones" may return links that can be accessed to stream digital content, links to official and unofficial content, links to images related to the search query, schedule times for airing of content, and/or other information. Users may browse search results in order to determine which search results include desired or relevant information. For example, if a user desires to stream "Game of Thrones," the user may input a search query of "Game of Thrones" and may skip search results related to show information and select search results that relate to streaming television.

Of the relevant search results, the user may find the search result that provides the desired information and may implement one or more actions to achieve an intended result or desired action. For example, the user may login to a streaming service and select an episode of "Game of Thrones" to consume. In another example, the user may search for instructions on how to connect devices wirelessly, adjust device settings, modify user accounts, and/or other information.

Embodiments of the disclosure include systems and methods for automatic execution of actions responsive to search queries. Certain embodiments may interpret user search queries or other queries, such as textual or voice-based queries, to determine an intent of the user, and may execute, or cause to be executed, a desired user action to be performed, in some instances, automatically. For example, if a user is searching for information related to updating a billing address for a user account, rather than returning search results, or in addition to returning search results, embodiments of the disclosure may present a user interface for updating the user's billing address. As a result, the user may not have to perform a number of actions, such as finding relevant search results, logging in to a user account, navigating to a billing address profile, etc., and may simply update the user's billing address in the user interface that is presented responsive to the user's search query. The user's desired objectives may therefore be accomplished while reducing the number of actions the user must complete, and reducing the amount of time spent by the user to find relevant or desired information.

This disclosure relates to, among other things, devices, systems, methods, computer-readable media, techniques, and methodologies for automatic execution of actions responsive to search queries. Certain embodiments automatically determine and/or detect query terms or search query keywords that are associated with corresponding actions, such as user actions, using machine learning and other methodologies. After determining actions that are associated with or that correspond to certain queries, embodiments of the disclosure may automatically implement or execute one or more actions responsive to the query, so as to reduce actions that a user may need to complete to satisfy a desired objective. Certain embodiments may use autocomplete data or suggested query data from one or more search engines to determine popular or likely search queries that a user may input. Autocomplete data may be used to determine actions that are to be automated, as compared to actions that may not be automated or that may be automated at a later time. Use of autocomplete information may improve a likelihood that automated actions are actually desired by users, and that a sufficient amount of data is available. In some embodiments, inputs at a service provider interface and/or user interactions with service provider interfaces may be used instead of, or in addition to, inputs at search engines. Service providers may include, for example, digital content providers, product providers, marketplace providers, informational content providers, and/or other providers.

Referring to FIG. 1, an example use case 100 for automatic execution of actions responsive to search queries in accordance with one or more example embodiments of the disclosure. For example, at a first user interface 110 in FIG. 1, a user may enter a query 112 of "how to connect phone to sonos" at a search engine. Responsive to the query, one or more remote servers may determine that the terms "connect phone" found in the query 112 are associated with a user action of "add wireless device." For example, certain search terms may be associated various user actions that the user is likely intending to accomplish, as determined based at least in part on behavior and actions of other users. In the example of FIG. 1, query terms and associated user actions may be stored in a query/user action database 120. Other examples of terms and associated user actions may include "default payment" associated with presentation of payment profile, "change address" associated with presentation of address profile, "wireless print" associated with sending a wake up signal to a printer, and so forth. Other examples of search queries that may be associated with actions include visit, create baby registry, student free-trial signup, set default payment method, follow Treasure Truck on Twitter, watch Super Bowl on FireTV stick, and other queries.

Based at least in part on the associated user action, one or more actions may be automatically implemented, or caused to be implemented, at the user device. For example, at a second user interface 130, a wireless connection settings user interface 132 may be automatically presented responsive to the search query 112. The user may therefore add the sonos device, or connect their phone to the sonos device, without having to browse the search results and navigate to the wireless connection settings user interface 132.

To determine which actions are to be associated with which search terms or sequences of characters, strings of text, or words, an example process flow 140 is presented and may be performed, for example, by one or more remote servers. The remote server and/or computer system may include at least one memory that stores computer-executable instructions and at least one processor configured to access the at least one memory and execute the computer-executable instructions to perform various actions or operations, such as one or more of the operations in a process flow 140 of FIG. 1.

At a first block 150, a set of seed verbs or phrases may be determined. The set of seed verbs or phrases may be automatically or manually generated and may be words associated with user actions. For example, seed verbs may include terms such as "visit," "create," "register," "sign up," and the like. In some embodiments, seed verbs or phrases may be determined based at least in part on popularity with respect to search engine queries. In other embodiments, seed terms may be words, such as nouns, terms, strings of text, sequences of characters, or the like.

At block 160, a first autocomplete result associated with a first seed verb at a first search engine may be determined. For example, certain embodiments may mine autocomplete results at a first search engine to determine popular queries and related user actions. In one example, seed verbs or words may be sent or input at the first search engine via one or more application programming interface(s) to generate a list of auto-suggested queries or autocomplete results. Each of the generated results may be recursively entered as search queries at the first search engine as a new seed phrase, and the corresponding autocomplete results may be determined and/or captured.

At block 170, a set of autocomplete results at the first search engine may be recursively determined. The recursive determinations may include using autocomplete results as new search queries until there are no further autocomplete results or until the autocomplete results match the search query. A recursive process may be used to determine a hierarchy of queries that can be used to determine which search phrases or queries were derived from others. For example, a query of "shoes" may yield "women's shoes," which in turn may yield "Adidas women's tennis shoes," and so forth. The set of autocomplete results may be refined to remove duplicates, similar results, and disambiguation of phrases using a filtering process that may include natural language processing.

At block 180, a user action associated with the first seed verb may be determined. The user action may be determined based at least in part on user actions performed by users that also performed the search query, or that searched for key terms of the search query (not necessarily the exact search query). In some embodiments, user actions may be selected or determined based at least in part on a univariate approach where an impact of a search query is individually measured on a relative user spend. In some embodiments, a multivariate time series approach may be used to determine user actions, which can use search, browse, and click patterns that follow a query in terms of their recentness, frequency, and interlude timings. For example, search queries may be discretized as vectors and used as covariates in a time-series model where the signal is change in behavioral activities over time.

At block 190, the user action associated with the search query or key term(s) may be automatically caused to occur responsive to the search query being input at a second search engine or service provider. The second search engine or service provider may be different than the first search engine. The user action may be implemented automatically or caused to be implemented, for example, at user device by a remote server, by the user device itself, or by another device. The user may therefore be presented with desired information or content without having to browse search results.

Embodiments of the disclosure may include automatic execution of actions responsive to search queries, and may include one or more databases with user actions associated with various terms or search queries. Such databases may be automatically generated and dynamically maintained via the use of one or more alternative search engines and autocomplete results. Embodiments of the disclosure may cause actions to occur automatically responsive to search queries, for example, via the presentation of certain user interfaces or via sending instructions to one or more user devices.

Example embodiments of the disclosure provide a number of technical features or technical effects. For example, in accordance with example embodiments of the disclosure, certain embodiments of the disclosure may automatically perform one or more actions or cause actions to be performed at user devices by sending instructions for execution at user devices. As a result of improved functionality, users may be presented with desired information responsive to search queries without having to sift through search results. Embodiments of the disclosure may improve computing efficiency and bandwidth by reducing a number of requests made of search engines and/or related search result content. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
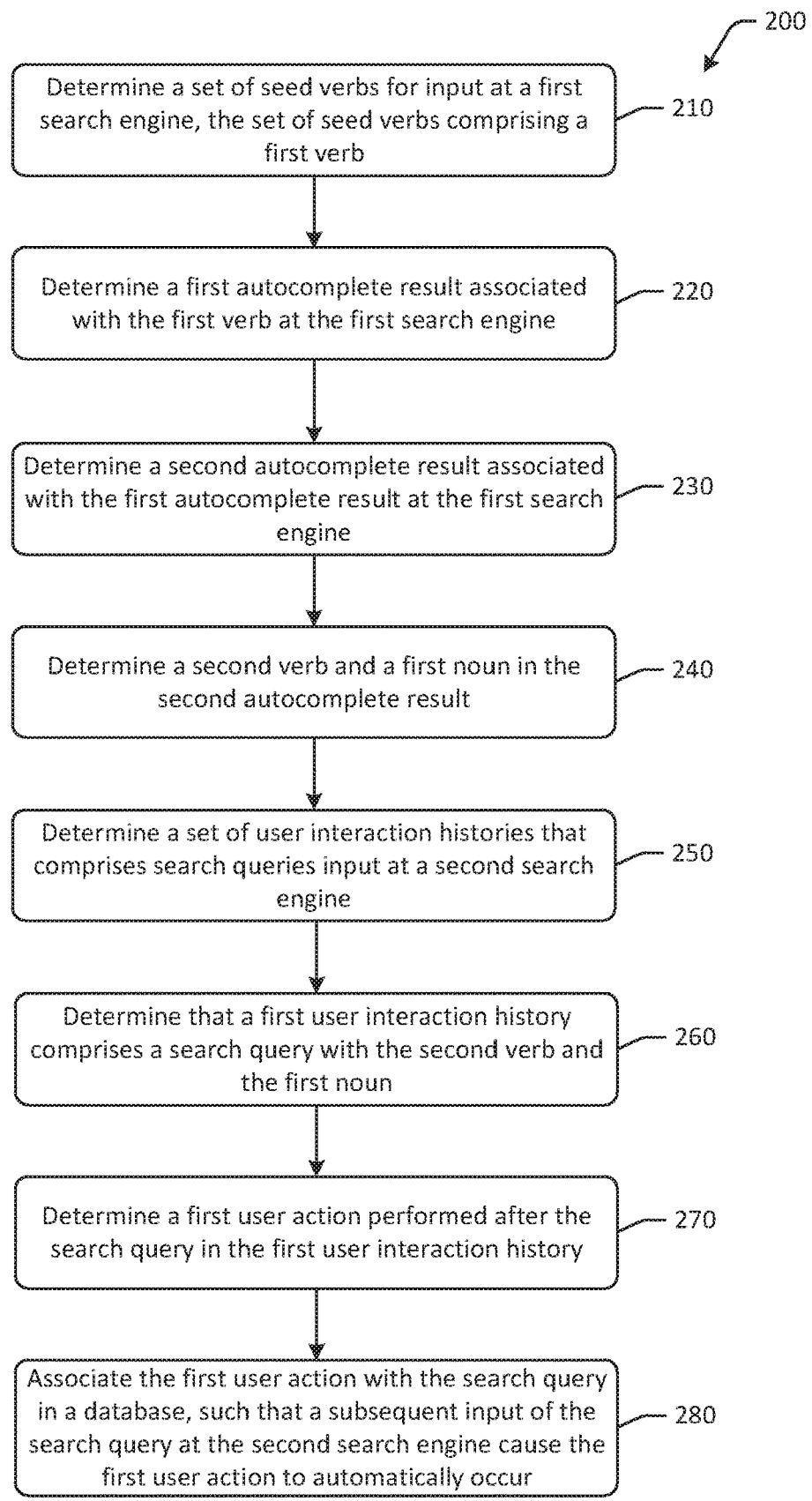
FIG. 2 is a schematic illustration of an example process flow for automatic execution of actions responsive to search queries in accordance with one or more example embodiments of the disclosure.

FIG. 2 depicts an example process flow 200 for automatic execution of actions responsive to search queries in accordance with one or more example embodiments of the disclosure. While example embodiments of the disclosure may be described in the context of search engines, it should be appreciated that the disclosure is more broadly applicable to any query functionality. Some or all of the blocks of the process flows in this disclosure may be performed in a distributed manner across any number of devices. The operations of the process flow 200 may be optional and may be performed in a different order.

At block 210 of the process flow 200, computer-executable instructions stored on a memory of a device, such as a remote server or a user device, may be executed to determine a set of seed verbs for input at a first search engine. The set of seed verbs may include a first verb. For example, a remote server may determine a set of one or more seed verbs. Seed verbs may be verbs that form a starting point for a determination of which queries are actionable or that may be suitable for automation. For example, a set of seed verbs may include manually or automatically generated verbs that correspond to actions that a user may take. Example verbs may include "update," "change," "buy," "pay," "stream," and/or other verbs. The set of seed verbs may be used as inputs at the first search engine in order to determine one or more associated autocomplete results. In some embodiments, seed verbs may be modified or changed into prompt phrases, such as "how do I update" or "how to change," etc. The set of seed verbs may begin with a base set of verbs for which synonyms may be found. An example method of forming or determining a set of seed verbs is discussed with respect to FIG. 3.

At block 220 of the process flow 200, computer-executable instructions stored on a memory of a device may be executed to determine a first autocomplete result associated with the first verb at the first search engine. For example, a remote server may determine for one or more, or each, of the verbs in the set of seed verbs, associated autocomplete results. In one example, the remote server may send the first verb, or a prompt phrase including the first verb, to the first search engine via one or more application programming interface(s) for input as a search query at the first search engine. In some embodiments, the remote server may request autocomplete results from the first search engine. Responsive to the request, or responsive to input as a query at the first search engine, the first search engine may return one or more autocomplete results. Autocomplete results may be predicted search queries that are determined by the first search engine or a related computer system and are indicative of a likely query that is being input. Autocomplete results may be ranked based at least in part on a probability that the autocomplete result corresponds to the query or input. For example, an input of "how to change" at the first search engine may result in a highest ranked autocomplete result of "how to change my name," followed by "how to change my address." The highest ranked autocomplete result may be determined to have the highest probability of being the intended query by the user inputting the search query at the first search engine. Accordingly, the first search engine may determine autocomplete results that are ranked based at least in part on a likelihood that the autocomplete result is the search query that is intended. Autocomplete results may be based on previous search query data and may change over time, as the first search engine receives more data and/or queries. Autocomplete results may be returned to the remote server via the application programming interface(s) and/or may be captured by the remote server after the first verb or prompt phrase is input at the first search engine (e.g., optical character recognition, image-based capturing, etc.).

In some embodiments, more than one autocomplete result may be determined. For example, autocomplete results having a ranking value of 10 or less, or 20 or less, etc. may be captured or determined. Ranking values may be representative of the position of the autocomplete result. For example, a top ranked autocomplete result may have a ranking value of 1, a second ranked autocomplete result may have a ranking value of 2, and so forth. In some embodiments, an autocomplete ranking threshold may be used to determine which autocomplete results to capture or determine. For example, the autocomplete ranking threshold may indicate that the top ten or top twenty ranked autocomplete results are to be captured and/or stored for recursively feeding back into the first search engine. In some instances, multiple autocomplete results may be available, in which case the autocomplete ranking threshold may be used to determine which autocomplete results to capture. Ranking values may be compared to the autocomplete ranking threshold to determine whether the autocomplete result ranking value satisfies the autocomplete ranking threshold. Individual ranking values for autocomplete results may be determined and stored in association with the respective autocomplete results. In some embodiments, only autocomplete results that include the first verb or the phrase input in the first search engine may be determined, as other autocomplete results may not be relevant.

At block 230 of the process flow 200, computer-executable instructions stored on a memory of a device may be executed to determine a second autocomplete result associated with the first autocomplete result at the first search engine. For example, a remote server may recursively send autocomplete results to the first search engine to determine subsequent autocomplete results. In one example, the first autocomplete result may be sent to the first search engine and/or input as a query at the first search engine, and a second autocomplete result associated with the first autocomplete result may be determined. The first autocomplete result may be input at the first search engine as a second search query, and a second autocomplete result from the first search engine may be determined responsive to input of the second search query. The autocomplete ranking threshold may be used to determine which of the autocomplete results to capture. For example, the remote server may determine that a second ranking value for the second autocomplete result satisfies the autocomplete ranking threshold. In an example, if the first autocomplete result is "how to change my address," a second autocomplete result may be "how to change my address for amazon purchases." The autocomplete results may be recursively input at the first search engine until exhaustion, or until there are no additional autocomplete results. In some embodiments, the recursive process may end when the autocomplete result is the same as the input query, which may indicate that there are no further autocomplete results (e.g., "how to change my address for amazon delivery" as a query results in an autocomplete result of "how to change my address for amazon purchases," etc.). The accumulated autocomplete results may be aggregated into a set of autocompleted results that includes, for example, the first autocomplete result and the second autocomplete result.

At block 240, computer-executable instructions stored on a memory of a device may be executed to determine a second verb and a first noun in the second autocomplete result. For example, the remote server may extract one or more terms or sequences of characters from the first autocomplete result and/or the second autocomplete result. The extracted terms may be a verb and/or a noun, or another term or combination of words. For example, the remote server may extract "change" and "address" or "change" and "amazon purchases." The extracted terms may be a second verb of "change" and a first noun of "address" in this example. Extracted terms may be used to determine correlations to other search queries performed by users.

At block 250, computer-executable instructions stored on a memory of a device may be executed to determine a set of user interaction histories that comprises search queries input at a second search engine. For example, the remote server may determine one or more user interaction histories of user accounts that include search queries associated with, or input at, a second search engine. The set of user interaction histories may include user interaction histories, such as browsing data, session data, clickstream data, etc. for one or more user accounts. The set of user interaction histories may include a first user interaction history associated with a user account. The first user interaction history may include digital user interactions, such as search queries, purchases, clicks, taps, voice commands, views, and/or other user interactions with a digital user interface for a user identifier or user account. The user interaction histories may include search query data for search queries that were input by users at a second search engine. The second search engine may be different than the first search engine.

At block 260, computer-executable instructions stored on a memory of a device may be executed to determine that a first user interaction history includes a search query with the second verb and the first noun. For example, the set of user interaction histories may include a first user interaction history associated with a user account. The remote server may determine that the first user interaction history includes a search query at the second search engine with the second verb and/or the first noun. For example, the first user may have searched for "changing my address" or "changing delivery address for amazon" at the second search engine. The remote server may determine that the search query input in the first user interaction history includes the second verb and/or the first noun.

At block 270, computer-executable instructions stored on a memory of a device may be executed to determine a first user action performed after the search query in the first user interaction history. For example, the first user interaction history may include user interaction data, such as selections, clicks, add to carts, purchases, etc. The remote server may determine that a first user action of selecting a user address profile for a user account was performed after the search query of "changing delivery address for amazon." The selection may be immediately after completing the search query, within a certain length of time (e.g., two minutes, etc.), within a certain number of user actions (e.g., within 10 interactions, etc.), or within another metric after inputting the search query.

At block 280, computer-executable instructions stored on a memory of a device may be executed to associate the first user action with the search query in a database, such that a subsequent input of the search query at the second search engine cause the first user action to occur or automatically occur. For example, the remote server may associate presenting a user address profile or prompt related to changing a user address profile with a search query that includes "change" and "address." As a result, future users that search for the same or similar queries may be automatically presented with a user interface to change the respective user's address, without having to find a relevant search result, navigate to the appropriate user interface, etc. In another example, the user browsing data in a user interaction history may be parsed and/or analyzed to determine that the browsing data includes a user action of changing a device display brightness setting after a search query of "changing brightness." The search query may therefore be associated with the user action of changing the device display setting in a user intended action database. As a result, one or more future or subsequent search queries by users at the second search engine may trigger an automatic action of the associated action, such as adjusting display brightness, address changes, making purchases, and/or other actions. For example, responsive to input of a certain search query, a device setting control user interface may be caused to be presented at a user device. In some embodiments, associated user actions may be automatically caused to be implemented at a user device responsive to input of a certain search query or a query that includes certain terms or characters.

Figure 3:
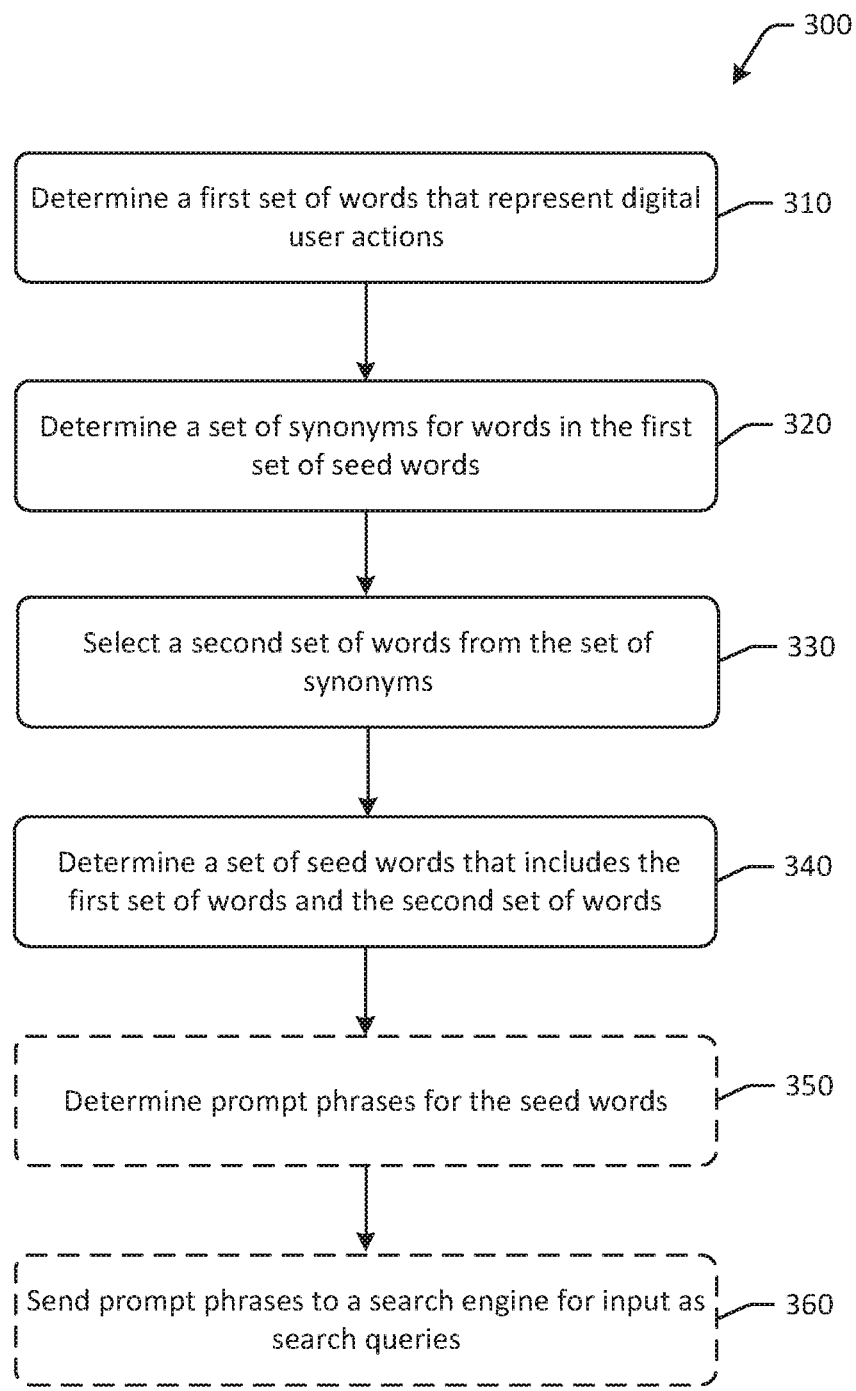
FIG. 3 is a schematic illustration of an example process flow for determining a set of seed words in accordance with one or more example embodiments of the disclosure.

FIG. 3 depicts an example process flow 300 for determining a set of seed words in accordance with one or more example embodiments of the disclosure. While example embodiments of the disclosure may be described in the context of words, it should be appreciated that the disclosure is more broadly applicable to any suitable sequence of characters. Some or all of the blocks of the process flows in this disclosure may be optional and may be performed in a distributed manner across any number of devices. The operations of the process flow 300 may be performed in a different order.

At block 310 of the process flow 300, computer-executable instructions stored on a memory of a device may be executed to determine a first set of words or seed words, such as nouns, verbs, etc. that represent digital user actions. For example, a remote server or a user device may be used to determine a first set of verbs or seed verbs (or any words) that represent digital user actions. In some embodiments, seed words may be generated manually. Seed verbs or words may include terms such as "update," "select," "change," "buy," "purchase," "connect," "sell," and other terms that may represent digital user actions, or actions that users may perform digitally, such as using an electronic device.

At block 320, computer-executable instructions stored on a memory of a device may be executed to determine a set of synonyms for words in the first set of seed words. For example, a remote server may query a database or another computer server to determine synonyms or alternate wording for one or more, or each, of the words in the first set of words or seed words. The synonyms may provide different ways of saying the same thing and may represent alternate searching terms that may be used by different users.

At block 330, computer-executable instructions stored on a memory of a device may be executed to select a second set of words from the set of synonyms. For example, the remote server may determine or select a second set of words or words from the set of synonyms. The second set of words or synonyms may be selected based at least in part on relevancy to the seed verb or word, a ranking value of the synonyms, a frequency of occurrence or usage of the synonym, and/or another factor or combination of factors. Selections may be based at least in part on information associated with the respective synonyms in a database or source of synonym information.

At block 340, computer-executable instructions stored on a memory of a device may be executed to determine a set of seed words that includes the first set of words and the second set of words. For example, the remote server may generate a set of seed words that includes the first set of words (which may be automatically or manually generated) and the second set of words (which includes the synonyms or alternate wording). The combined set of words may form the set of seed words. The set of seed words may be used as inputs at a search engine for which associated autocomplete results are to be determined.

At optional block 350, computer-executable instructions stored on a memory of a device may be executed to determine prompt phrases for the seed words. For example, a seed word may be "connect." Some users may query using phrases rather than terms. Accordingly, in some embodiments, "connect" may be converted to a prompt phrase of "can I connect" or "how to connect," in order to reflect phrasing or wording that users may use when querying the word. In some embodiments, prompt phrases may be automatically generated using one or more natural language processing tools or predefined rules that add words or arrange words in a certain manner. Prompt phrases may be questions or other forms of partial or full sentences and may or may not include punctuation marks, such as question marks.

At optional block 360, computer-executable instructions stored on a memory of a device may be executed to send prompt phrases to a search engine for input as search queries. For example, the remote server may send the respective prompt phrases for the set of seed words as inputs as search queries to a search engine. In some embodiments, the remote server may input the prompt phrases at the search engine. In some instances, the prompt phrases may be sent or input at the search engine instead of the seed words, while in other embodiments the prompt phrases may be sent or input in addition to the set of seed words. The prompt phrases may therefore be used to determine associated autocomplete results.

In some embodiments, determining a set of seed words for input at a search engine may include determining a first set of words (e.g., manually or automatically, or a combination thereof), determining a set of synonyms of the first set of words, determining or selecting a second set of words in the set of synonyms, and determining the set of seed words that includes the first set of words and the second set of words.

Figure 4:
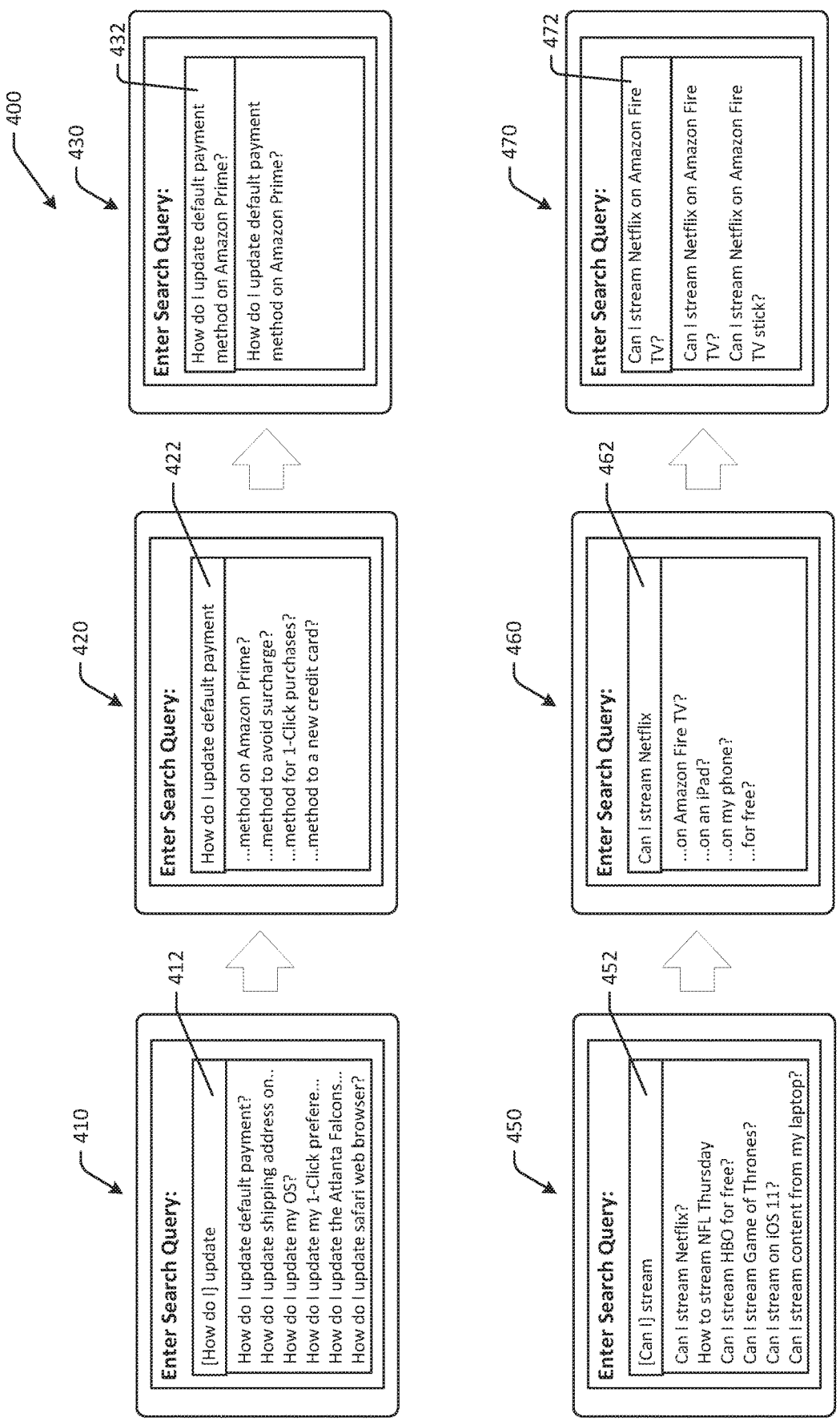
FIG. 4 is a schematic illustration of example user interfaces with various autocomplete phrases in accordance with one or more example embodiments of the disclosure.

FIG. 4 depicts example user interfaces 400 with various autocomplete phrases in accordance with one or more example embodiments of the disclosure. In the first and second rows of user interfaces illustrated in FIG. 4, an example recursive process of feeding or inputting autocomplete results or phrases is depicted. The recursive process may continue until there are no new or different autocomplete results, or there are no autocomplete results returned.

For example, at a first user interface 410, a first search query 412 may be entered at a search engine. The first search query 412 may be a verb, such as "update," or may be a prompt phrase that includes the verb, such as "how do I update" (the brackets indicate terms that may be added to form a prompt phrase). As illustrated at the first user interface 410, a search query input of "how do I update" may return a number of autocomplete results, such as "how do I update default payment," "how do I update shipping address on . . . ," and so forth. The autocomplete results may be presented in an order.

One or more of the autocomplete results at the first user interface 410 may be captured, along with a ranking value in some instances, and input as a search query at the search engine. For example, at a second user interface 420, the first autocomplete result at the first user interface 410 may be input as a second search query 422 of "how do I update default payment." Another set of autocomplete results may be determined by the search engine and may include, for example, "how do I update default payment method on amazon prime?" "how do I update default payment method to avoid surcharge?" and so forth. Because the second search query 422 may be more specific than the first search query 412, a fewer number of autocomplete results may be presented in some instances.

One or more of the autocomplete results at the second user interface 420 may be determined and stored, along with a ranking value in some instances, and input as a search query at the search engine. For example, at a third user interface 430, a third search query 432 of "how do I update default payment method on amazon prime?" may be the first autocomplete result at the second user interface 420. At the third user interface 430, the search engine may return an autocomplete result of "how do I update default payment method on amazon prime?" which may be the same as the third search query 432. This may indicate that there are no additional autocomplete results for the search query, and the recursive process for the first ranked autocomplete results may be completed. In some embodiments, the recursive process may be complete when no autocomplete results are provided by the search engine.

In another example, at a fourth user interface 450 of FIG. 4, a search query verb of "stream" may be optionally converted to a first prompt phrase 452 of "can I stream" and may be entered or input as a search query at a search engine. The search engine may return a number of autocomplete results, such as "can I stream Netflix?" Some or all of the autocomplete results may be input as search queries, with the corresponding autocomplete results captured and input as queries themselves until no additional queries are available or a certain number of autocomplete results have been determined. For example, a second prompt phrase 462 or search query of "can I stream Netflix?" may be input at a second user interface 460, and an autocomplete result of "can I stream Netflix on amazon fire tv?" may be input as a third prompt phrase 472 at a third user interface 470. As there are multiple autocomplete results at the third user interface 470, the process may be continued until there are no remaining autocomplete results or until a certain number of autocomplete results have been determined.

Figure 5:
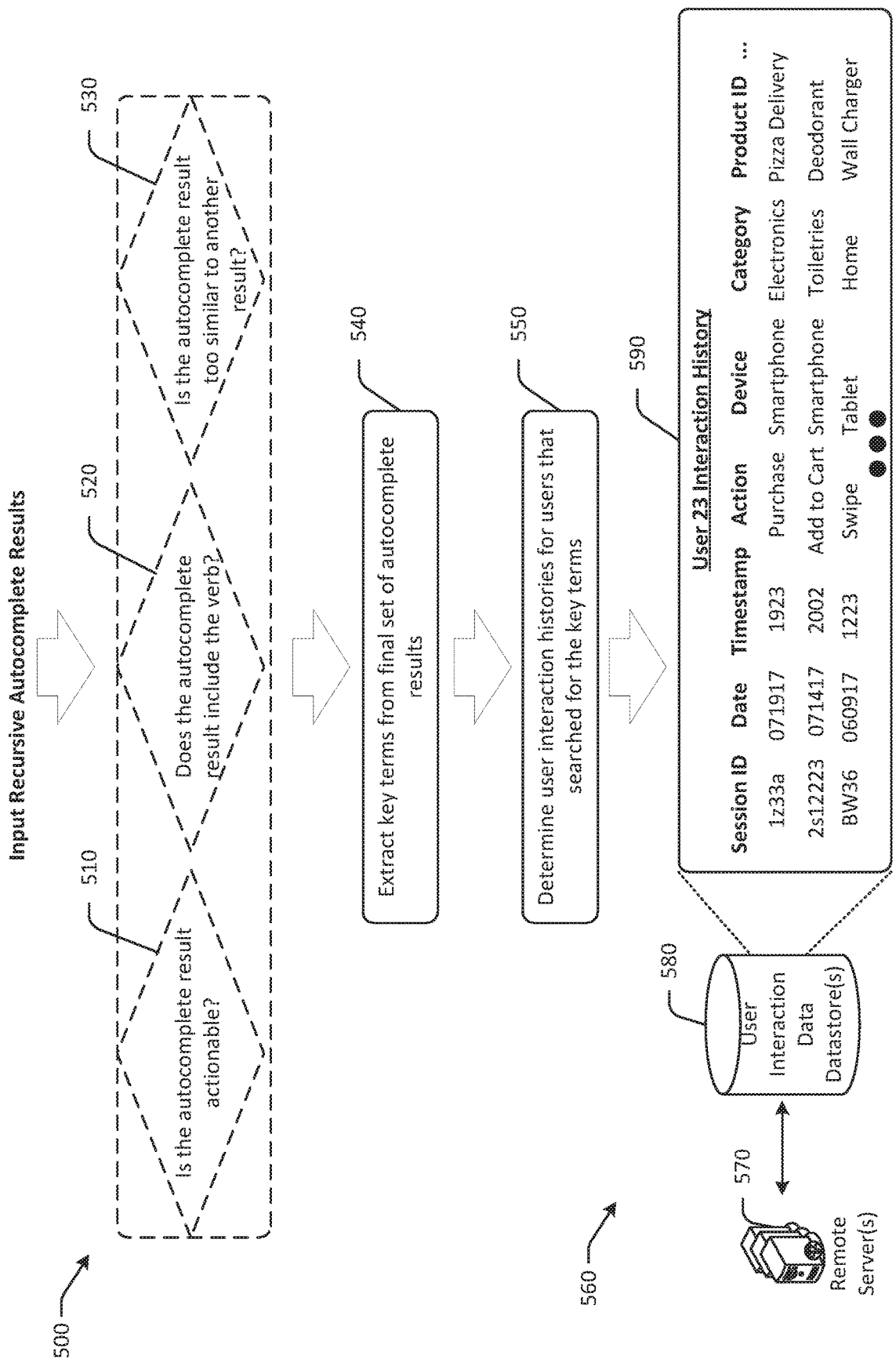
FIG. 5 is a schematic illustration of an example process flow for filtering autocomplete results in accordance with one or more example embodiments of the disclosure.

FIG. 5 depicts an example hybrid process flow 500 for filtering autocomplete results in accordance with one or more example embodiments of the disclosure. After determining a set of autocomplete results, for example using a recursive process, the autocomplete results may be input into a filtering system at, for example, a remote server or other computing system. The filtering system may make one or more determinations with respect to the autocomplete results to determine whether any of the autocomplete results are to be removed. For example, repetitive autocomplete results may be removed, autocomplete results that are not associated with user actions may be removed, and/or other filtering criteria may be used to remove one or more autocomplete results.

In the example of FIG. 5, at a first optional determination block 510, a determination is made as to whether a certain autocomplete result is actionable. For example, computer-executable instructions stored on a memory of a device may be executed to determine whether a certain autocomplete result is actionable, or whether a user that is searching with that query desires to perform an action. Actionability, or whether or not an autocomplete result is actionable, may be determined based at least in part on whether the autocomplete result includes a verb, whether the verb is associated with a digital user interaction, and so forth. For example, the remote server may determine that an autocomplete result includes a verb in a predefined set of actionable verbs, and the autocomplete result may therefore be determined to be an actionable search query. In another example, the remote server may determine that an autocomplete result associated with a particular verb does not include the particular verb, and as a result, the autocomplete result may be filtered out of the search results and discarded, or otherwise deleted.

In another example, at a second optional determination block 520, a determination is made as to whether the autocomplete result includes the verb. For example, computer-executable instructions stored on a memory of a device may be executed to determine whether a certain autocomplete result includes the seed verb that was used to generate the autocomplete result. For example, an autocomplete result of "am I eligible for prime now" responsive to a seed verb query of "delivery" may be determined not to include the seed verb, and as a result, may be filtered out or deleted or discarded as it may not be actionable.

In another example, at a third optional determination block 530, a determination is made as to whether the autocomplete result is too similar to another result. For example, computer-executable instructions stored on a memory of a device may be executed to determine whether any two autocomplete results are too similar to each other. Autocomplete results that are too similar may create unnecessary entries and may decrease consistency, and may therefore be removed in some instances. Accordingly, in some embodiments, the remote server may determine that an autocomplete result associated with a certain verb is similar to another autocomplete result, and one of the autocomplete results may be discarded.

To determine similarity, in one example, the remote server may convert autocomplete results from alphabetical characters to numerical values and determine a difference between the two numerical representations of the autocomplete results. For example, A may be converted to 1, B may be converted to 2, C may be converted to 3, and so forth. The numerical representations of the autocomplete results may be compared and similarity may be determined based at least in part on differences in the respective numerical representations. In some embodiments, autocomplete results may be converted to vector representations using an encoding process. For example, a first autocomplete result may be encoded as a first vector, a second autocomplete result may be encoded as a second vector, and a difference between the first vector and the second vector may be determined and used to represent the similarity between the two autocomplete results. Encoding may include converting the alphabetic characters to numeric values. For example, a first vector representation of a first autocomplete result may include numerical values instead of letters, a second vector representation of a second autocomplete result may include numerical values instead of letters, and a difference between individual values of the first vector representation and the second vector representation may be determined. The difference may be compared to a phrase difference threshold to determine whether the phrase difference threshold is satisfied. The phrase difference threshold may be a minimum numerical difference between the two autocomplete results to indicate that the autocomplete results are sufficiently different from each other.

After removing or filtering out certain autocomplete results, at block 540, key terms from the final set of autocomplete results may be extracted. For example, key terms may be verbs and/or nouns that appear in autocomplete results. In some embodiments, key terms may be punctuation, such as question marks, titles, names, product names, pronouns, or other terms. For example, seed verbs and/or nouns may be extracted from one or more of the final set of autocomplete results.

At block 550, the remote server may determine user interaction histories for users that searched for the key terms. For example, computer-executable instructions stored on a memory of a device may be executed to determine or identify user interaction histories, which may include browsing data, clickstream data, etc. that include searches with one or more of the key terms. Accordingly, users or user accounts that searched for the key terms may be identified. The user interaction histories may include search data for search queries performed on a search engine that may be different than the search engine used to generate the autocomplete results.

In one example, a search history associated with a user account for a second search engine (different than the search engine used for the autocomplete results in one example) may be determined. For example, in a process 560, a remote server 570 may query one or more user interaction data datastore(s) 580 to identify user accounts that are associated with search queries including the key terms. User 23 may be determined to be associated with search queries that include the key terms. Accordingly, a user interaction history data 590 for User 23 may be determined. The user interaction history data 590 may include historical user interaction data related to digital and/or physical user interactions associated the user identifier. For example, digital user interactions such as clicks, tapes, swipes, or other product selections, as well as detail page views, product review views, product rating views, add to carts, purchases, audio data consumption, and other user interactions may be stored in the user interaction history data 590. The user interaction history data 590 may include browsing data associated with the user account. The browsing data may be for a first time interval preceding the search query with the key terms, as well as browsing data for a second time interval following the search query with the key terms.

The user interaction history data 590 may be used to determine actions the user took before the search query and after the search query, in order to determine what action the user intended to take during the search query. If a certain user action can be determined to correspond to the search query with the key terms, the action may be associated with the key terms and/or the particular search query for automatic implementation responsive to search queries by the same user or other users at the search engine.

In some embodiments, more than one user interaction history may be found to correlate the same key terms to the action before the action is associated with the key terms or search query for automatic implementation. For example, a total set of user interaction histories that include the search query may be determined, and a threshold number of the total set of user interaction histories may be determined to include an indication that the same user action was performed after input of the search query before the action is associated with the key terms or search query for automatic implementation.

Figure 6:
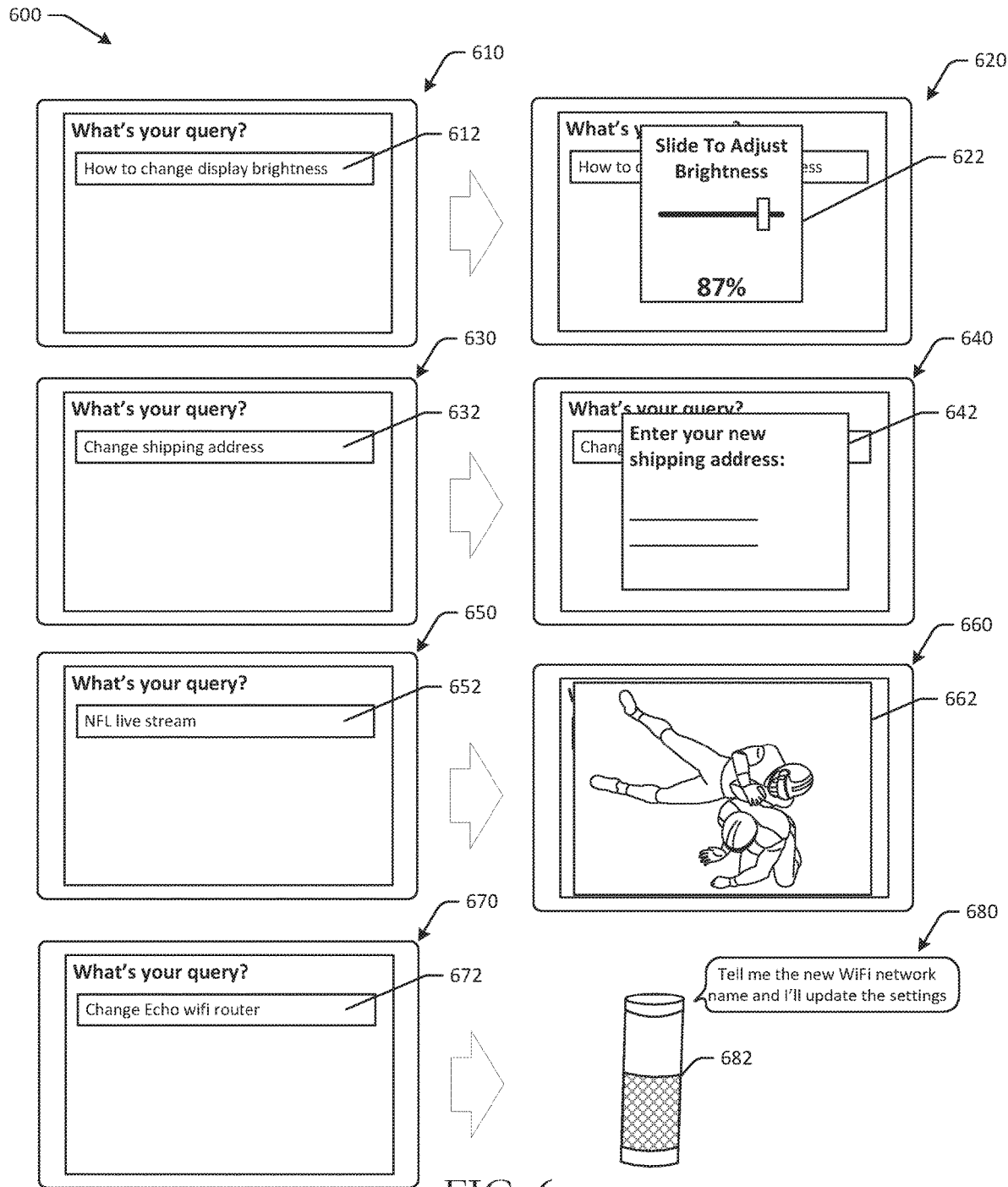
FIG. 6 is a schematic illustration of example use cases of search queries and automatically executed actions in accordance with one or more example embodiments of the disclosure.

FIG. 6 depicts example use cases 600 of search queries and automatically executed actions in accordance with one or more example embodiments of the disclosure. In FIG. 6, certain queries, such as search queries, input at a search engine may trigger automatic execution of certain actions at a user device or user interface. Certain terms in search queries, or certain search queries, may be associated with one or more digital user actions in one or more databases. In instances where one of those search queries is inserted or input in the search engine, the corresponding or associated action may be automatically executed or implemented, without further action by the user.

For example, at a first user interface 610, a user may input a first search query 612 of "how to change display brightness" at a search engine. The terms "change" and "display brightness" may be associated with a user action of presenting a control panel for display settings. As a result, at a second user interface 620 presented after the first user interface 610, a brightness adjustment control panel 622 may be automatically presented. The user may adjust the brightness using the control panel 622, and may not have to search through links or content in search results for the desired objective.

In another example, at a third user interface 640, a user may input a second search query 632 of "change shipping address" at a search engine. The terms "change" and "shipping" may be associated with a user action of presenting a default user profile shipping address. As a result, at a fourth user interface 640 presented after the third user interface 630, an entry form 642 to update a shipping address may be automatically presented. The user may input or update a shipping address associated with the user's profile using the entry form 642, and may not have to search through links or content in search results for the desired objective.

In another example, at a fifth user interface 650, a user may input a third search query 652 of "NFL live stream" at a search engine. The terms "NFL" and "stream" may be associated with a user action of presenting streaming video of an NFL game. As a result, at a sixth user interface 660 presented after the fifth user interface 650, a window 662 of streaming NFL live content, such as an ongoing NFL game, may be automatically presented. The user may consume the streaming content, and may not have to search through links or content in search results for the desired objective.

In another example, at a seventh user interface 670, a user may input a query 672 at a search engine or service provider interface of "change Echo WiFi router." The terms "change" and "router" may be associated with an action of updating or adding a WiFi connection at one or more devices, such as Echo devices. As a result, one or more devices, such as an Echo device 682, may be caused to present audio content. For example, the Echo device 682 may playback audio content 680 of "tell me the new WiFi network name and I'll update the settings." The user may then audibly interact with another device (the Echo 682 device instead of, or in addition to, the tablet device, etc.) to change the WiFi router and/or other settings.

One or more operations of the methods, process flows, or use cases of FIGS. 1-6 may have been described above as being performed by a user device, or more specifically, by one or more program module(s), applications, or the like executing on a device. It should be appreciated, however, that any of the operations of the methods, process flows, or use cases of FIGS. 1-6 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-6 may be described in the context of the illustrative devices, it should be appreciated that such operations may be implemented in connection with numerous other device configurations.

The operations described and depicted in the illustrative methods, process flows, and use cases of FIGS. 1-6 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 7:
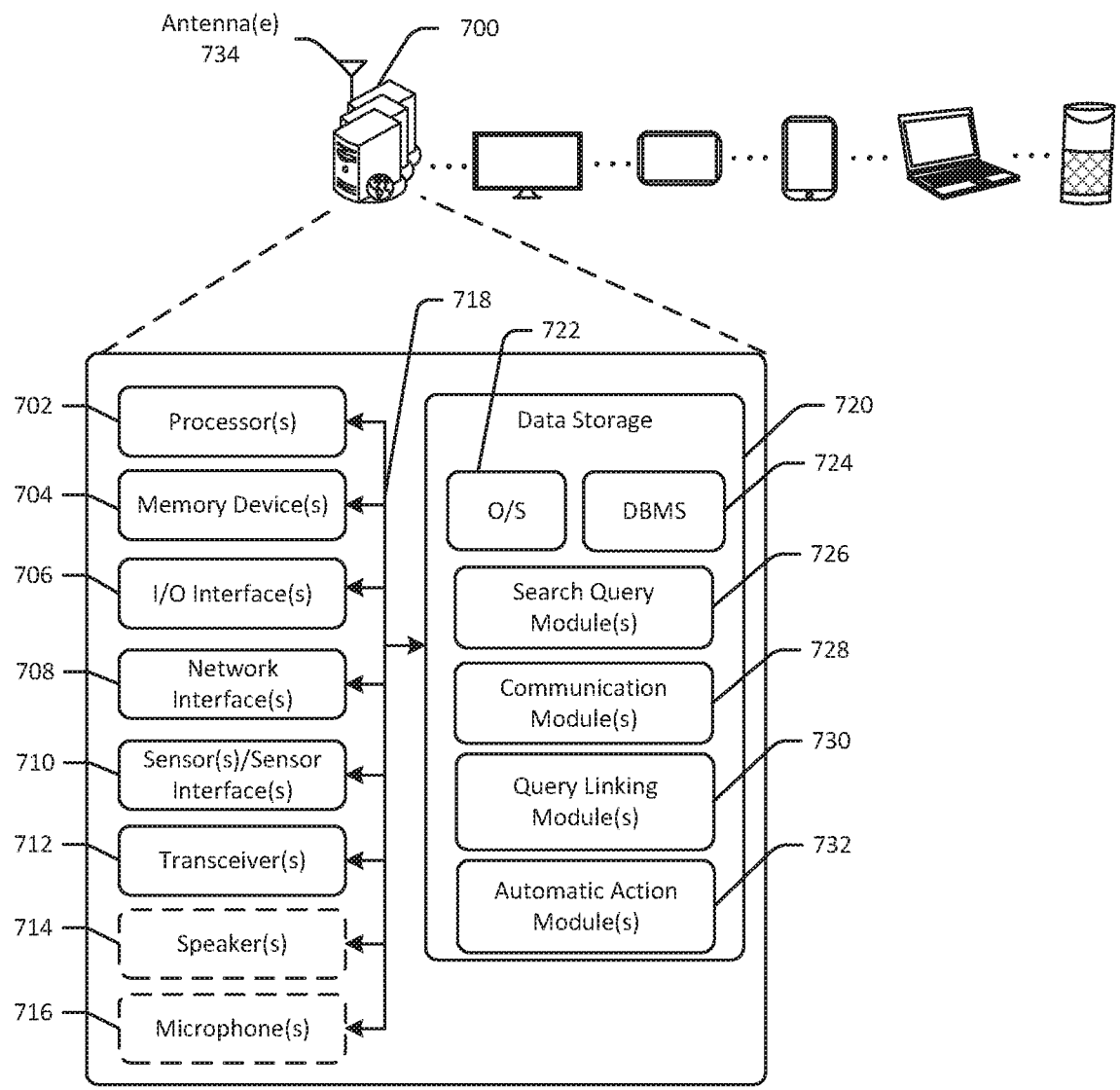
FIG. 7 is a schematic block diagram of an illustrative device in accordance with one or more example embodiments of the disclosure.

FIG. 7 is a schematic block diagram of an illustrative remote server 700 in accordance with one or more example embodiments of the disclosure. The remote server 700 may include any suitable computing device capable of receiving and/or generating data including, but not limited to, a mobile device such as a smartphone, tablet, e-reader, wearable device, or the like; a desktop computer; a laptop computer; a content streaming device; a set-top box; or the like. The remote server 700 may correspond to an illustrative device configuration for the devices of FIGS. 1-6.

The remote server 700 may be configured to communicate via one or more networks with one or more servers, search engines, user devices, or the like. In some embodiments, a single remote server or single group of remote servers may be configured to perform more than one type of searching and/or automatic action execution functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the remote server 700 may include one or more processors (processor(s)) 702, one or more memory devices 704 (generically referred to herein as memory 704), one or more input/output (I/O) interface(s) 706, one or more network interface(s) 708, one or more sensors or sensor interface(s) 710, one or more transceivers 712, one or more optional speakers 714, one or more optional microphones 716, and data storage 720. The remote server 700 may further include one or more buses 718 that functionally couple various components of the remote server 700. The remote server 700 may further include one or more antenna(e) 734 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 718 may include at least one of a system bus, a memory bus, an address bus, or a message bus, and may permit exchange of information (e.g., data (including computer-executable code), signaling, etc.) between various components of the remote server 700. The bus(es) 718 may include, without limitation, a memory bus or a memory controller, a peripheral bus, an accelerated graphics port, and so forth. The bus(es) 718 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 704 of the remote server 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 720 may include removable storage and/or non-removable storage including, but not limited to, magnetic storage, optical disk storage, and/or tape storage. The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to memory 704 for use by the processor(s) 702 during the execution of the computer-executable instructions. Moreover, output data generated as a result of execution of the computer-executable instructions by the processor(s) 702 may be stored initially in memory 704, and may ultimately be copied to data storage 720 for non-volatile storage.

More specifically, the data storage 720 may store one or more operating systems (O/S) 722; one or more database management systems (DBMS) 724; and one or more program module(s), applications, engines, computer-executable code, scripts, or the like such as, for example, one or more search query module(s) 726, one or more communication module(s) 728, one or more query linking module(s) 730, and/or one or more automatic action module(s) 732. Some or all of these module(s) may be sub-module(s). Any of the components depicted as being stored in data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in data storage 720 may support functionality described in reference to correspondingly named components earlier in this disclosure.

The data storage 720 may further store various types of data utilized by components of the remote server 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 724 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 7, the datastore(s) may include, for example, purchase history information, user action information, user profile information, a database linking search queries and user actions, and other information.

The processor(s) 702 may be configured to access the memory 704 and execute computer-executable instructions loaded therein. For example, the processor(s) 702 may be configured to execute computer-executable instructions of the various program module(s), applications, engines, or the like of the remote server 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to functionality supported by the various program module(s) depicted in FIG. 7, the search query module(s) 726 may include computer-executable instructions, code, or the like that responsive to execution by one or more of the processor(s) 702 may perform functions including, but not limited to, communicating with one or more devices, for example, search engine servers or devices, search engine user interfaces, etc., communicating with remote servers, communicating with remote datastores, determining autocomplete results and rankings, determining autocomplete results with certain terms or words, determining prompt phrases, and the like.

The communication module(s) 728 may include computer-executable instructions, code, or the like that responsive to execution by one or more of the processor(s) 702 may perform functions including, but not limited to, communicating with one or more devices, for example, via wired or wireless communication, communicating with remote servers, communicating with remote datastores, sending or receiving notifications or search queries/autocomplete results, communicating with cache memory data, and the like.

The query linking module(s) 730 may include computer-executable instructions, code, or the like that responsive to execution by one or more of the processor(s) 702 may perform functions including, but not limited to, determining user actions to be associated with queries or search queries, determining user actions, determining user interaction histories, associating actions with queries or search queries, and the like.

The automatic action module(s) 732 may include computer-executable instructions, code, or the like that responsive to execution by one or more of the processor(s) 702 may perform functions including, but not limited to, defining user action events, managing and/or modifying digital user interaction or browsing history data, causing devices to implement certain actions, causing devices to implement certain actions responsive to search queries or other queries, and the like.

Referring now to other illustrative components depicted as being stored in the data storage 720, the O/S 722 may be loaded from the data storage 720 into the memory 704 and may provide an interface between other application software executing on the remote server 700 and hardware resources of the remote server 700. More specifically, the O/S 722 may include a set of computer-executable instructions for managing hardware resources of the remote server 700 and for providing common services to other application programs (e.g., managing memory allocation among various application programs). In certain example embodiments, the O/S 722 may control execution of the other program module(s) to dynamically enhance characters for content rendering. The O/S 722 may include any operating system now known or which may be developed in the future including, but not limited to, any server operating system, any mainframe operating system, or any other proprietary or non-proprietary operating system.

The DBMS 724 may be loaded into the memory 704 and may support functionality for accessing, retrieving, storing, and/or manipulating data stored in the memory 704 and/or data stored in the data storage 720. The DBMS 724 may use any of a variety of database models (e.g., relational model, object model, etc.) and may support any of a variety of query languages. The DBMS 724 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server 700 is a mobile device, the DBMS 724 may be any suitable light-weight DBMS optimized for performance on a mobile device.

Referring now to other illustrative components of the remote server 700, the input/output (I/O) interface(s) 706 may facilitate the receipt of input information by the remote server 700 from one or more I/O devices as well as the output of information from the remote server 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), FireWire, Thunderbolt, Ethernet port or other connection protocol that may connect to one or more networks. The I/O interface(s) 706 may also include a connection to one or more of the antenna(e) 734 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The remote server 700 may further include one or more network interface(s) 708 via which the remote server 700 may communicate with any of a variety of other systems, platforms, networks, devices, and so forth. The network interface(s) 708 may enable communication, for example, with one or more wireless routers, one or more host servers, one or more web servers, and the like via one or more of networks.

The antenna(e) 734 may include any suitable type of antenna depending, for example, on the communications protocols used to transmit or receive signals via the antenna (e) 734. Non-limiting examples of suitable antennas may include directional antennas, non-directional antennas, dipole antennas, folded dipole antennas, patch antennas, multiple-input multiple-output (MIMO) antennas, or the like. The antenna(e) 734 may be communicatively coupled to one or more transceivers 712 or radio components to which or from which signals may be transmitted or received.

As previously described, the antenna(e) 734 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 734 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 734 may be configured to transmit or receive radio frequency signals within any suitable frequency range forming part of the unlicensed portion of the radio spectrum.

The antenna(e) 734 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna(e) 734—transmitting or receiving radio frequency (RF) signals in the bandwidth and/or channels corresponding to the communications protocols utilized by the remote server 700 to communicate with other devices. The transceiver(s) 712 may include hardware, software, and/or firmware for modulating, transmitting, or receiving—potentially in cooperation with any of antenna(e) 734—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communications protocols utilized by the remote server 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 714 may be any device configured to generate audible sound. The optional microphone(s) 716 may be any device configured to receive analog sound input or voice data.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote server 700, and/or hosted on other computing device(s) accessible via one or more networks, may be provided to support functionality provided by the program module(s), applications, or computer-executable code depicted in FIG. 7 and/or additional or alternate functionality. Further, functionality may be modularized differently such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should further be appreciated that the remote server 700 may include alternate and/or additional hardware, software, or firmware components beyond those described or depicted without departing from the scope of the disclosure. More particularly, it should be appreciated that software, firmware, or hardware components depicted as forming part of the remote server 700 are merely illustrative and that some components may not be present or additional components may be provided in various embodiments. While various illustrative program module(s) have been depicted and described as software module(s) stored in data storage 720, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
   determining, by one or more computer processors coupled to at least one memory, a first set of verbs that represent digital user actions;
   determining a set of synonyms for verbs in the first set of verbs;
   selecting a second set of verbs from the set of synonyms;
   determining a set of seed verbs comprising the first set of verbs and the second set of verbs;
   determining a prompt phrase using a first seed verb of the set of seed verbs, wherein the prompt phrase is a question comprising the first seed verb;
   sending the prompt phrase to a first search engine for input as a first search query;
   determining a first autocomplete result from the first search engine responsive to input of the first search query;
   determining that the first autocomplete result comprises the first seed verb;
   sending the first autocomplete result to the first search engine for input as a second search query;
   determining a second autocomplete result from the first search engine responsive to input of the second search query;
   determining a set of autocompleted results comprising the first autocomplete result and the second autocomplete result;
   extracting the first seed verb and a first noun from the first autocomplete result;
   determining a search history associated with a user account for a second search engine;
   determining that the search history comprises a fourth search query, the fourth search query comprising the first seed verb and the first noun;
   determining first browsing data associated with the user account, wherein the first browsing data is for a first time interval preceding the fourth search query;
   determining second browsing data associated with the user account, wherein the second browsing data is for a second time interval after the fourth search query;
   determining that the second browsing data comprises a user action of changing a device setting;
   associating the fourth search query with the user action of changing the device setting in a user intended action database;
   determining that the fourth search query is input at the second search engine at a user device; and
   causing a device setting control user interface to be presented at the user device responsive to input of the fourth search query.

2. The method of claim 1, further comprising:
   sending the second autocomplete result to the first search engine for input as a third search query; and
   determining that a third autocomplete result from the first search engine responsive to input of the third search query is the same as the second autocomplete result.

3. The method of claim 1, further comprising:
   determining that a first ranking value for the first autocomplete result satisfies an autocomplete ranking threshold; and
   determining that a second ranking value for the second autocomplete result satisfies the autocomplete ranking threshold.

4. The method of claim 1, further comprising:
   determining a first vector representation of the first autocomplete result, wherein the first vector representation comprises numerical values instead of letters;
   determining a second vector representation of the second autocomplete result, wherein the second vector representation comprises numerical values instead of letters;
   calculating a difference between individual values of the first vector representation and the second vector representation; and
   determining that the difference satisfies a phrase difference threshold.

5. A method comprising:
   identifying, by one or more computer processors, a set of seed words for input at a first search engine, the set of seed words comprising a first word;
   determining a set of autocomplete results associated with the first word by recursively submitting autocomplete results to the first search engine until an autocomplete result matches the set of seed words, or until a predetermined number of results have been submitted to the first search engine, wherein the set of autocomplete results comprises a first autocomplete result and a second autocomplete result;
   determining a second word and a first noun in the second autocomplete result;
   determining a set of user interaction histories with a service provider that comprise queries input at the service provider or at a second search engine, the set of user interaction histories comprising a first user interaction history associated with a user account;
   determining that the first user interaction history comprises a query with the second word and the first noun;
   associating a user action with the query in a database;
   determining that the query is input at the service provider or the second search engine at a user device; and
   automatically causing the user action to be implemented at the user device responsive to input of the query.

6. The method of claim 5, wherein the query is a first query, the method further comprising:
   determining a second user interaction history that comprises a second query with the first word and a second noun;
   determining a second user action performed after the second query in the second user interaction history; and
   associating the second user action with the second query in the database.

7. The method of claim 5, further comprising:
   determining a total set of user interaction histories comprising the query; and determining that a threshold number of the total set of user interaction histories comprise an indication that the user action was performed after input of the query.

8. The method of claim 5, further comprising:
determining that the first autocomplete result satisfies an autocomplete ranking threshold; and
determining that the second autocomplete result satisfies the autocomplete ranking threshold.

9. The method of claim 5, further comprising:
determining that the first autocomplete result comprises the first word;
determining that a third autocomplete result associated with the first word does not include the first word; and
discarding the third autocomplete result.

10. The method of claim 5, further comprising:
determining a prompt phrase comprising the first word;
wherein determining the first autocomplete result associated with the first word at the first search engine comprises determining the first autocomplete result associated with the prompt phrase at the first search engine.

11. The method of claim 5, further comprising:
determining that a third autocomplete result associated with the first word is similar to the first autocomplete result; and
discarding the third autocomplete result.

12. The method of claim 5, wherein determining the set of seed words for input at the first search engine comprises:
determining a first set of verbs;
determining a set of synonyms of the first set of verbs;
determining a second set of verbs in the set of synonyms; and
determining the set of seed verbs comprising the first set of verbs and the second set of verbs.

13. The method of claim 5, further comprising:
determining that a third autocomplete result associated with the second autocomplete result at the first search engine is the same as the second autocomplete result.

14. The method of claim 5, further comprising:
encoding the first autocomplete result as a first vector;
encoding the second autocomplete result as a second vector; and
determining a difference between the first vector and the second vector.

15. The method of claim 5, further comprising:
determining that the first autocomplete result is an actionable query.

16. A device comprising:
at least one memory that stores computer-executable instructions; and
at least one processor configured to access the at least one memory and execute the computer-executable instructions to:
determine a set of seed words for input at a first search engine, the set of seed words comprising a first word;
determine a set of autocomplete results associated with the first word by recursively submitting autocomplete results to the first search engine until an autocomplete result matches the set of seed words, or until a predetermined number of results have been submitted to the first search engine, wherein the set of autocomplete results comprises a first autocomplete result and a second autocomplete result;
determine a second word and a first noun in the second autocomplete result;
determine a set of user interaction histories that comprises queries input at a second search engine, the set of user interaction histories comprising a first user interaction history associated with a user account;
determine that the first user interaction history comprises a query with the second word and the first noun;
associate a user action with the query in a database;
determine that the query is input at the service provider or the second search engine at a user device; and
automatically cause the user action to be implemented at the user device responsive to input of the query.

17. The device of claim 16, wherein the at least one processor is further configured to access the at least one memory and execute the computer-executable instructions to:
determine a total set of user interaction histories comprising the query; and
determine that a threshold number of the total set of user interaction histories comprise an indication that the user action was performed after input of the query.

18. The device of claim 16, wherein the at least one processor is further configured to access the at least one memory and execute the computer-executable instructions to:
determine that the first autocomplete result comprises the first word;
determine that a third autocomplete result associated with the first word does not include the first word; and
discard the third autocomplete result.

19. A method comprising:
determining, by one or more computer processors coupled to at least one memory, a prompt phrase using a first seed verb of a first set of verbs that represents digital user actions;
sending the prompt phrase to a first search engine for input as a first search query;
determining a set of autocomplete results associated with the first word by recursively submitting autocomplete results to the first search engine until an autocomplete result matches an autocomplete result supplied on a current iteration, or until a predetermined number of results have been submitted to the first search engine, wherein the set of autocomplete results comprises a first autocomplete result and a second autocomplete result;
determining the first seed verb from the second autocomplete result;
determining that a search history associated with a user account for a second search engine comprises a third search query that has the first seed verb;
determining first user activity data associated with the user account for a first time interval after the third search query;
determining that the first user activity data comprises a user action of changing a device setting; and
causing a device setting control user interface to be presented at the user device responsive to input of the fourth search query.

* * * * *